Figure 1:
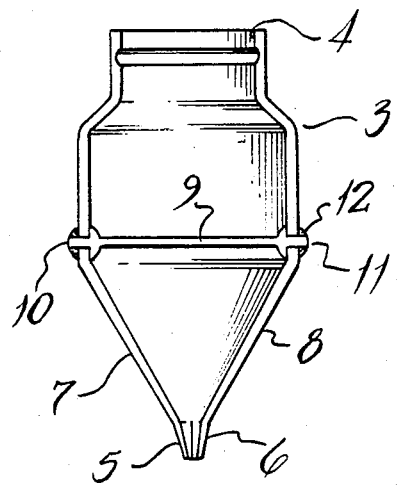

United States Patent [19]

Gladstone

[11] Patent Number: 4,494,575
[45] Date of Patent: Jan. 22, 1985

[54] GRAVITY DUMP VALVE

[75] Inventor: Robert S. Gladstone, Newbury, England

[73] Assignee: Coopers Filters Limited, Manchester, England

[21] Appl. No.: 462,975

[22] Filed: Feb. 1, 1983

[30] Foreign Application Priority Data

Feb. 13, 1982 [GB] United Kingdom ................. 8204267

[51] Int. Cl.³ ....................... F16K 15/14; B01D 46/48
[52] U.S. Cl. ........................................ 137/846; 55/432
[58] Field of Search ................. 55/425, 432; 210/113, 210/118; 137/517, 519, 513.5, 846; 251/122

[56] References Cited

U.S. PATENT DOCUMENTS

| | | | |
|---|---|---|---|
| 2,328,382 | 8/1943 | Langdon | 137/846 |
| 2,371,449 | 3/1945 | Langdon | 137/846 |
| 2,598,002 | 5/1952 | Langdon | 137/846 |
| 2,642,259 | 6/1953 | Catlin | 251/122 |
| 3,586,040 | 6/1971 | Urback | 137/517 |
| 3,595,266 | 7/1971 | Brookman et al. | 55/432 |
| 3,898,701 | 8/1975 | Russa | 137/846 |
| 3,901,272 | 8/1975 | Banners et al. | 137/513.5 |

FOREIGN PATENT DOCUMENTS 1407919  8/1970  Fed. Rep. of Germany ........ 55/432
 971851 10/1964  United Kingdom .

Primary Examiner—David L. Lacey
Attorney, Agent, or Firm—Cushman, Darby & Cushman

[57] ABSTRACT

A rubber or elastomer gravity dump valve for an air cleaner is provided with an internal bracing strut to control the compliance of the valve discharge lips. The strut extends across the valve at or adjacent to the point of lip initiation.

2 Claims, 3 Drawing Figures

U.S. Patent    Jan. 22, 1985    4,494,575

GRAVITY DUMP VALVE

This invention relates to air cleaners of the kind incorporating a dump valve operable to discharge filtered matter such as dust at periodic intervals.

Examples of such valves made of rubber are found in British Pat. Nos. 1,238,884 and 1,238,885. The valve operates by virtue of the weight of dust accumulated inside it above a pair of normally closed discharge lips. However, it must be appreciated that the pressure inside the valve is (in the case of automotive air cleaners) sub-atmospheric due to the action of the engine induction sustem. Where simple rubber valves are used, the range of sub-atmospheric pressure (the depression) over which the valve will function reliably is relatively narrow. Too high a depression and the discharge lips of the valve are held shut. It is therefore normal practice to bias the discharge lips very slightly open in the static state. They must close on operation of the engine, to prevent air from leaking in and entraining the dust which it is intended to discharge.

It is an object of this invention to increase the reliable operating range of a gravity dump valve.

According to the present invention a gravity dump valve of rubber or other suitable elastomeric material incorporates an internal rigid bracing strut located at or adjacent the point of lip initiation. The point of lip initiation is the point at which the normally round (or oval) body portion of the valve commences to taper towards the discharge lips. It is preferred that the strut be positioned across the inside of the valve in a direction substantially normal to the line of contact between the lips.

It has been found that this simple modification enables a conventional gravity dump valve to operate reliably over a greater range of depressions, such as from 2.5 to 12.5 cm of water.

This is thought to be due to improved control of the compliance of the lips as shown by increased resistance to lip deformation under high depressions.

Figure 2:
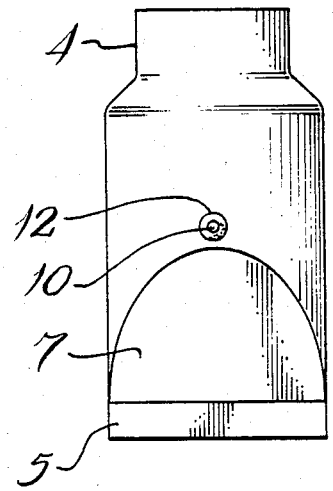
Figure 3:
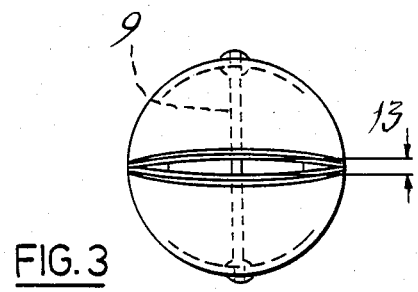

In order that the invention be better understood a preferred embodiment of it will be be described by way of example with reference to the accompanying drawing, in which:

FIG. 1 is a cross-sectional view taken through the center of the lips of a valve according to the invention, FIG. 2 is a side view of the outside of the valve of FIG. 1, and FIG. 3 is a plan view of FIG. 2, looking towards the lips.

Referring to the figures, the valve has a generally cylindrical body portion 3 terminating at one end in a generally cylindrical sleeve 4 adapted to be engaged with a dust outlet pipe (not shown) for an aircleaner (not shown). The opposite end of the body portion terminates in a pair of lips 5, 6 formed by providing two essentially flat regions 7, 8 on diametrically opposed sides of the body. These flat regions give a gradual transition or taper from a circular to a linear cross-section at the lips. The lips are biased open (in the static state) to give a gap of about 3 mm, as shown in FIG. 3, at 13. Inside the valve there is a nylon bracing strut 9 extending from a point 10 adjacent the start of one flat region across to a similar point 11 adjacent the start of the other flat region. The point 10 is shown in FIG. 2, to illustrate that a convenient way of fitting the strut is to make two small apertures for insertion of the strut. The latter is then secured in place with adhesive, 12.

I claim:

1. A gravity dump valve for an air cleaner comprising an unreinforced, tubular elastomeric body having an inlet and and outlet spaced apart from the inlet, the outlet being in the form of a tapered body portion terminating in discharge lips which are normally closed and a rigid bracing strut extending across the inside of the valve in the tubular body at or adjacent the region where the tubular elastomeric body commences to taper towards the lips.

2. A gravity dump valve according to claim 1, wherein the strut extends across the inside of the valve in a direction substantially normal to the line of contact between the lips.

* * * * *